United States Patent
Hernadi

(10) Patent No.: US 12,337,966 B2
(45) Date of Patent: Jun. 24, 2025

(54) METHODS FOR IMPROVEMENTS OF THE CLOSED WING AIRCRAFT CONCEPT AND CORRESPONDING AIRCRAFT CONFIGURATIONS

(71) Applicant: Andras Hernadi, Stockholm (SE)

(72) Inventor: Andras Hernadi, Stockholm (SE)

(*) Notice: Subject to any disclaimer, the term of this patent is extended or adjusted under 35 U.S.C. 154(b) by 0 days.

(21) Appl. No.: 17/162,644

(22) PCT Filed: Aug. 19, 2018

(86) PCT No.: PCT/SE2018/050835
§ 371 (c)(1),
(2) Date: Jan. 29, 2021

(87) PCT Pub. No.: WO2020/040671
PCT Pub. Date: Feb. 27, 2020

(65) Prior Publication Data
US 2022/0242565 A1   Aug. 4, 2022

(51) Int. Cl.
*B64C 39/06* (2006.01)
*B64C 3/56* (2006.01)

(52) U.S. Cl.
CPC ............. *B64C 39/068* (2013.01); *B64C 3/56* (2013.01)

(58) Field of Classification Search
CPC ............................ B64C 39/068; B64C 23/069
See application file for complete search history.

(56) References Cited

U.S. PATENT DOCUMENTS

| | | |
|---|---|---|
| 3,834,654 A | 9/1974 | Miranda |
| 4,053,125 A | 10/1977 | Ratony |
| 4,146,199 A | 3/1979 | Wenzel |
| 4,365,773 A | 12/1982 | Wolkovitch |
| 4,541,593 A | 9/1985 | Cabrol |
| D292,911 S | 11/1987 | Argondezzi |
| D304,821 S | 11/1989 | Ratony |
| 5,503,352 A | 4/1996 | Eger |
| 6,474,604 B1 | 11/2002 | Carlow |
| 8,220,737 B2 * | 7/2012 | Wood ................ B64C 29/0025 244/45 R |
| D724,001 S | 3/2015 | Garreau |
| D843,920 S | 3/2019 | Hernadi |

(Continued)

FOREIGN PATENT DOCUMENTS

| | | |
|---|---|---|
| BG | 65998 B1 | 6/2009 |
| DE | 20111224 U1 | 1/2002 |

(Continued)

*Primary Examiner* — Ashesh Dangol
(74) *Attorney, Agent, or Firm* — Addison D Ault; IPGentleman Intellectual Property Services, LLC

(57) ABSTRACT

Closed wing aircraft design and configuration with three wings on either side of the fuselage wherein at least one closed frame is established between the 1st wing and the 2nd wing, by using at least one bracing entity. A separate closed frame is established between the 2nd wing and the 3rd wing, by using at least one bracing entity. Each of said closed frames defines its own aerodynamic channel. The framework is strong and stiff, the mutually supported parts level out the stress. The fuselage is lifted in three points. The Aspect Ratio is high and the wingspan is relatively short but there are embodiments wherein the 3rd wing has an extended folding tip section.

4 Claims, 4 Drawing Sheets

(56) References Cited

U.S. PATENT DOCUMENTS

| | | | |
|---|---|---|---|
| D844,538 S | 4/2019 | Hernadi | |
| 10,899,447 B2 | 1/2021 | Hernadi | |
| 2006/0091263 A1* | 5/2006 | Houck, II | ............... B63B 1/248 244/45 R |
| 2020/0247525 A1* | 8/2020 | Manterola Ottonello | .................... B64C 3/16 |

FOREIGN PATENT DOCUMENTS

| | | |
|---|---|---|
| DE | 3121115 A1 | 1/2017 |
| EM | 002544510-0001 | 9/2014 |
| EM | 002544510-0002 | 9/2014 |
| EP | 2896563 A1 | 3/2014 |
| EP | 3121115 A1 | 1/2017 |
| ES | 2896563 A1 | 3/2014 |
| FR | 2936490 A1 | 4/2010 |
| GB | 2266873 A | 11/1993 |
| SE | 002544510-0001 | 9/2014 |
| SE | 002544510-0002 | 9/2014 |
| WO | WO 8805011 | 7/1988 |
| WO | WO-8805011 A1 * | 7/1988 ............. B64C 39/08 |
| WO | WO 8806551 | 9/1988 |
| WO | WO 03059736 A2 | 7/2003 |
| WO | WO 2004074093 A1 | 9/2004 |
| WO | WO 216048211 A1 | 3/2016 |
| WO | WO 2019086742 * | 10/2018 |

* cited by examiner

METHODS FOR IMPROVEMENTS OF THE CLOSED WING AIRCRAFT CONCEPT AND CORRESPONDING AIRCRAFT CONFIGURATIONS

CROSS REFERENCE TO RELATED APPLICATIONS

This application is related to RCD EM 002544510-0001 and 002544510-0002, both filed on Sep. 25, 2014, with OHIM/OAMI Reference "StratosLiner"; and also related to the pending U.S. Design patent application No. 29520505 filed on Mar. 16, 2015, titled "Backward and forward swept aircraft wing sections in a decagonal box wing configuration". Said U.S. Design patent application became a Divisional application, US DIV 29584541, resulting in two design patents: U.S. D843,920 S (Mar. 26, 2019) and U.S. D844,538 S (Apr. 2, 2019). The two distinct embodiments of these designs are related to the Application PCT/SE2015/050349, filing date Mar. 24, 2015, published as WO2016048211 A1, also with file reference "StratosLiner". National Phase applications: EP 15717275 (pending), U.S. Ser. No. 15/512,546, granted, U.S. Pat. No. 10,899,447 B2 (Jan. 26, 2021), CN 201580051870, granted, No. of announcement of grant: CN 107000841 B, utility ("Invention") patent No. ZL201580051870.

BACKGROUND AND THE PRIOR ART

The present invention relates to the field of closed wing aircraft design, with a focus on novel improvements of some of the features and adding new elements to the prior art in this field. This invention constitutes a new sub-class within Closed Wings (box wing, ring wing, joined wings) in the broader class Non-Planar Aircraft Wings. The above PCT application was also a new sub-class within Closed Wings; nevertheless, the present invention is significantly different from both the three established sub-classes and the above patent pending invention.

The conventional box wing configuration comprising a backward swept front wing, a forward swept rear wing and a non-lifting wingtip fence which is a side wing, a structural interconnecting bracing part between the wingtips of the front and rear wings. The front wing is extending from the lower part of the fuselage and the rear wing is extending from the upper aft part of the fuselage, or the roots of the two joined rear wings are elevated above the aft part of the fuselage, using a vertical stabilizer, or two V-tail fins, for structural connection to the fuselage. The conventional joined wing configuration does not have the above wingtip fence, but the structural connection between the wingtips of the front and rear wings is more direct, usually comprising an aerodynamic wingtip-body which both wingtips are attached to. It should be mentioned that there are closed wing configurations wherein the front wing is located higher up than the rear wing, but these are aerodynamically much worse than the above opposite wing arrangement.

Ludwig Prandtl's "best wing system" is almost 100 years old but it has not been realized yet. U.S. Pat. No. 3,834,654 A is a usual reference regarding "boxplane wing", emphasizing low induced drag and close combat maneuverability. The wings shown in U.S. Pat. No. 4,053,125 are similar but without the interconnecting "fin" between the wingtips, a configuration called joined wings. U.S. Pat. No. 4,146,199 A has a box wing structure without torpedo-shaped aerodynamic bodies in the tip junctions, and it tries to shape the fuselage as a lifting body. U.S. Pat. No. 4,365,773 A presents a joined wing configuration with a winglet in the wingtip junctions, extending vertically, both up and down. U.S. D304821 shows three wings on either side, each of them with its own wingtip extension, outside a slim longitudinal wingtip-body, interconnecting the three joined wingtips. U.S. D292911 is a simple configuration with three wings wherein the wingtips with equal chord length are exactly under each other in top view. U.S. Pat. No. 6,474,604 B1 presents several wingtip-embodiments, trying to eliminate the tip vortices. GB 2 266 873 A is a box wing/joined wing aircraft wherein the aft fuselage section (a cargo container) is detachable, and thereby the rear wings and the vertical stabilizer (attached to the rear wings) have no direct structural connection to the fuselage—during the return flight, after dropping the container ("hazardous waste disposal") into the sea (sic!). Instead of the usual wingtip fence, the wingtips are interconnected by a jet engine on either side. In some embodiments, further pylon-mounted engines are deployed on the rear wings, further jeopardize stability and structural integrity. FR 2 936 490 A1 is a "ring wing" aircraft (more or less), with two tip engines, wherein the area of the upper+lower wing makes it possible to produce the same lift as a reference cantilever aircraft—but the span is much less. WO 88/05011 A1 is an aircraft with two or three pairs of boxed wings, wherein the airflow from the front propellers is deviated by multiple flaps, making "hovering" possible. Airbus EP 3 121 115 A1 is cited by the ISA (D5), because the claimed "coupling device" can fold the wing of the aircraft (span reduction). But the most relevant aspect (relevant for the present Description) is the correct aero terminology (from Airbus!) explaining the terms "C-wing", "C-wing configuration", "C-wing like winglet", "top wing", "side wing", "wing assembly", as well as providing guidance about what a wing "section" is vs. wing portion. The ISA cited also EP 2 896 563 A1, a morphing wing with mobile upper surface, relevant because morphing wing technology is mentioned in the present invention.

Most modern box wing aircraft designs with ambition for good aerodynamic performance have long and narrow wings such as WO 2004/074093 A1 or BG 65998 B1. Some designers reinforce the root of the thin and narrow front wing by using less sweep angle of the trailing edge at the root, for example BG 65998 B1. Other designers employ such an extra triangular wing area along half of the inboard trailing edge of the front wing, for easy installation of the flaps, such as DE 201 11 224 U1. The claims of WO 2004/074093 A1 focus on the aerodynamic channel between the tail fins and the rear wings. There is a box wing design where the inboard portion of the rear wing is anhedral and the outboard portion is dihedral, namely WO 88/06551 A1. Another design, WO 03/059736 A2, has three pairs of wings with the ambition of using the Coanda effect. A "joined-wing tilt-wing aircraft" was introduced in U.S. D724001, but it is a standard box wing configuration with an additional, shorter middle wing, without physical contact with the two boxed wings. The place between the boxed wings is large enough for the propeller deployed on the tilting middle wing, providing VTOL or STOL capability.

U.S. Pat. No. 5,503,352 A is a conventional box wing aircraft in several aspects except the small canard attached to the low front, claiming enhanced stability, controllability and improvement in the carrying properties. One of the relevant features is that the canard is deployed on the same vertical level as the low-mounted member of the boxed wings. Another multi-surface aircraft with additional canard is presented in U.S. Pat. No. 4,541,593 A. In some embodiments, this canard is disposed "at the end of a mast" above and in front of the cockpit. In other embodiments it is disposed very close to the nose of the fuselage, vertically in a slightly lower position than the other wings. The wing structure is complicated in some embodiments; it seems to be variations of double joined wings with extra fins outside the tip junctions. Regardless of how many wings are depicted, all wing roots are fuselage-mounted, except the mast-mounted canard. In some embodiments, the joined wingtips are connected to another tip junction. In a relevant figure (FIG. 13) it is clear that it is about two separate joined wing frames, wherein all wings are extending from the fuselage. The other relevance to the present invention comprising the fact that there is no structural interconnecting part between the two separate wing junctions (said FIG. 13).

Some of the cited prior art have obvious issues as regards interference between the multiple wings. Some of them have short and massive boxed wings which means low Aspect Ratio, i.e. poor aerodynamic performance. Joined wing configurations bring the tip portions of the connected wings too close to each other, causing disturbances of the airflow. Many box wing structures of the prior art have insufficient vertical separation. There are many junctions involved in a multi-surface wing system and they must be carefully designed. Few of the cited prior art patents pay sufficient attention to the aerodynamic importance of the junctions. Some of them address this issue with torpedo-shaped aerodynamic bodies deployed in the junctions, but some of these depicted solutions ruin the possible advantages with their multiple outer fins connected to these "torpedoes". The main wings of both cited patents with canard may suffer from disturbances of the airflow, because the main wing is in the wake of the canard. Exception is the canard disposed "at the end of a mast", obviously exposed to vibrations.

The above mentioned three related designs, EM 002544510-0001, EM 002544510-0002 and the U.S. Design application No. 29520505 are boxed wing structures with focus on the use of as many implementations of the Golden Ratio and the angles of the Golden Triangle as possible, as they are generally considered sources of beauty. The reason for these designs was to test the thesis: if an airplane is beautiful, it flies beautifully.

The two distinct embodiments of these designs are related to the pending WO2016048211 A1; but said Utility patent application presents several aerodynamic and structural features with great potential to industrial applicability far beyond the mentioned aesthetic ornamental appearance. Furthermore, the described features solve several problems with the conventional box wing concept, by introducing more wing separation; improved strength and stiffness; shorter wingspan with low root bending; large wing area combined with high Aspect Ratio which is an unsolved issue for very large aircraft; several aerodynamic channels for better aerodynamics; different sweep angles for better cross-sectional area distribution; improved closed frame structure with minimized flutter-tendency; redundancy of aerodynamic devices for better maneuverability and increased safety, etc. These features, functions and qualities are not revealed in the drawings of the related Design applications.

SUMMARY OF THE INVENTION

The present application represents distinguishing improvements of the concept presented in the PCT Application WO2016048211 A1. That previous concept is based on a box wing aircraft with a boxed wing frame with and without a middle wing. In that previous concept, as well as in all conventional box wing configurations, the wingtip of the front or first wing and the wingtip of the rear or last wing are structurally interconnected by a wingtip fence, a non-lifting side wing. Such a wingtip fence is an essential structural part of the box wing concept of the prior art. If a middle wing is present in a prior-art box wing configuration, its wingtip, or both wingtips in case of a split-wing, is/are connected to the said wingtip fence. In a joined wing configuration of the prior art, the vertical separation between the wingtip of the front or first wing and the wingtip of the rear or last wing is much less; said wingtips are structurally interconnected much more directly, usually by a torpedo-shaped aerodynamic body. If a middle wing is present in a prior-art joined wing configuration, its wingtip is connected to the same, common tip junction.

The present invention follows a different approach. There are three main wings on either side of the fuselage. The 2nd wing and the 3rd wing form a closed frame, either a box wing or a joined wing configuration, because there is a structural interconnection between the wingtip of the 2nd wing and the 3rd wing. The 2nd wing is attached to the upper middle portion of the fuselage; in some embodiments as a shoulder wing, in other embodiments as a high wing or a parasol wing. The root of the 3rd wing is elevated above the aft part of the fuselage. Said 3rd wing is structurally interconnected to the fuselage by at least one tail fin. In some embodiments, the wingspans of the said three wings are equal, while in other embodiments are different.

The 1st wing is low-mounted, located vertically below and horizontally in front of the 2nd wing. The wingtip of said 1st wing has at least one structural interconnection to the 2nd wing. The number one reason for said interconnection is bracing, i.e. structural support, for reducing deformations, vibrations, flutter, as well as for increasing strength and stiffness.

The complex wing structure of the present invention has many parts and there are many junctions between them. It is more clarifying to call the parts, that form a structural interconnection between two neighboring main wings, entities. An entity is an aircraft part, or a portion of an aircraft part, participating in the bracing structural interconnection between two neighboring main wings, having a distinct and independent existence or (bracing) function.

In some embodiments, there is a bracing interconnection between the 1st and the 2nd wing, comprising a forward swept, anhedral, lift-producing bracing wing entity, with its root attached to the lower surface of the mid-portion of the 2nd wing, and its tip attached to the bent tip of the 1st wing. In some embodiments, there is a bracing interconnection between the 1st and the 2nd wing, comprising a wingtip-fence entity, a side wing, with its low front end attached to the wingtip of the 1st wing, and its aft upper end attached to the wingtip portion of the 2nd wing. In some embodiments, both of the described two different bracing entities are present.

The bracing interconnections, between the 1st and the 2nd wing, as well between the 2nd wing and the 3rd wing, may comprise additional entities in the junctions, e.g. wingtip fence, aerodynamic body, a propulsion unit or a bracing entity of a propulsion unit. Propulsion integration is part of the present invention. Several embodiments are presented with tip engines. There are embodiments using different combinations of junctions of the prior art. One of the features making the various closed wing configurations of the present invention different from the prior art is that there is no structural interconnecting entity between the wingtip of the 1st wing and the wingtip of the 3rd wing.

The method and apparatus of the above WO2016048211 A1 is significantly improved in the present invention. The 2nd wing is not divided into sections in the present invention, and thereby the Aspect Ratio, directly related to the aerodynamic performance, is calculated for the entire length of the 2nd wing. The Aspect Ratio value is higher for the undivided wingspan of the present invention. The upper surface of the 2nd wing has no attached parts between root and tip, and thereby the spanwise airflow-acceleration on and above the upper surface of the 2nd wing is uninterrupted, from root to tip.

DETAILED DESCRIPTION OF THE INVENTION

Figure 1:
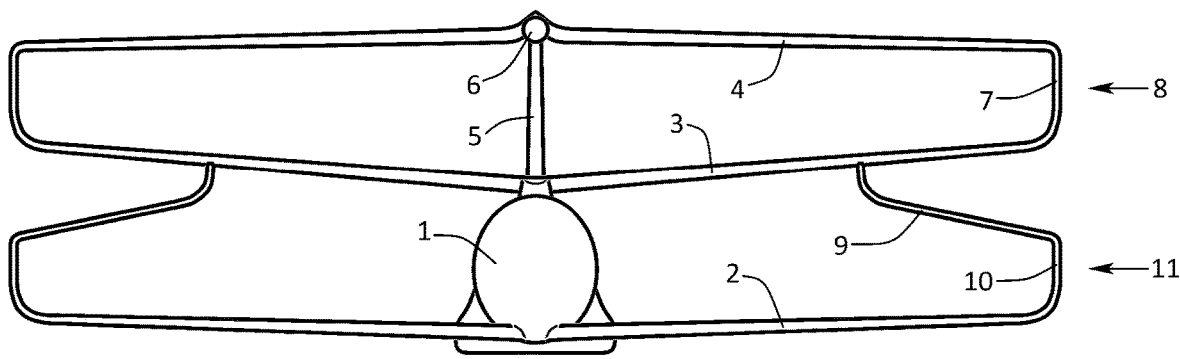
FIG. 1 is a front elevation view of a double boxed wing embodiment of the invention, with one tail fin.

Before explaining the drawings and presenting different embodiments of the invention, it is to be understood that the revealed concepts, principles, methods, solutions and embodiments are not intended to be limited to the details of the presented arrangements and structures in the above and the following description or illustrated in the drawings. The disclosed embodiments are to be considered non-restrictive illustrative examples of the principles of the invention. Obvious modifications, variations, other embodiments, designs, structures, methods and concepts, based on this presentation and the claims, in a manner which is understood by those skilled in the art, do not depart from the scope of the present invention in its broadest form. Various changes and modifications may be practiced within the scope of the invention and the appended claims. The drawings depict, and the description discusses more embodiments, more details, aspects, structures or components than those strictly necessary for the interpretation of the claimed invention and for the support of the claims as formulated. Such elements are to be considered information for the understanding of the broad applicability of the claimed method and apparatus, illustrations of variations within the scope of the invention and storytelling for the reader not fully skilled in the art.

This invention is in no way limited to those types or categories of aircraft the presented embodiments indicate. The scope of the invention is applicable to any aircraft of any size, any purpose and application; manned or unmanned for any mission profile; and with any type of propulsion or combination of different propulsion systems for different flying conditions, without any restrictions as regards speed, altitude or function. The scope of the invention is not limited by materials. Any materials can be used allowing the construction and operation of the invention. Airfoils, junctions and other details of the presented structures and embodiments are established in a way that will be understood by those skilled in the art.

Using the term "engine" or the more general term "propulsion unit" refers to any method of producing thrust. Any sketch or description of such a device is chosen as an illustration of a principle or a method with no restriction to a particular embodiment or structure. Propulsion units may be positioned slightly different. The design of their junctions and the presented propulsion integration in general is not limited to the illustrations. Descriptions of a plurality of engines in specific locations also apply distributed propulsion, not limited to the presented locations. No presented structural connections between the aircraft parts, selected for the illustration of the principle, has limiting aspects for the scope of the presented embodiments.

Any wing can have bent leading and trailing edges; especially root and tip portions can have a three-dimensional bending. Any structural interconnection can comprise more than one part, and bracing/supporting parts do not have to be straight beams between two points. The leading edge or trailing edge of a wing does not have to be a straight line between root and tip. A structural connection or interconnection (two words, used as synonyms) between two wings, or between other aircraft parts than wings, can also comprise or be composed of an engine housing or another aerodynamic body, alone or together with other parts. The depicted and described embodiments illustrate a variety and combinations of entities and junctions. There is an important distinction between connecting an entity to a wingtip of a wing and connecting an entity to a wingtip portion of a wing. In the first case, the junction is located at the very end of the wing, i.e. at the wingtip, and there is no portion of the wing outside the said tip junction. When an entity is attached to the wingtip portion, there is always some not negligible outboard portion of the wingtip structure, outside the said junction.

It is emphasized that the design process and the development to a market-ready aircraft are highly sophisticated tasks, comprising many iterative multidisciplinary steps. It is even more relevant for a new concept with a complex multi-surface wing structure, a field with not fully explored aerodynamics, aeroelasticity and other disciplines of aeronautics. It is not possible to predict the dynamic load and the resonance frequencies acting on such a large complex framework, during transonic flight conditions at −70 degrees Celsius, minutes after takeoff from an airfield with +50 degrees Celsius. Even new, basically traditional cantilever aircraft prototypes can behave strange in final tests, because of the difficulties involved in the process of development. Many details must be changed before the first passenger can embark. Therefore, the description, the drawings and the claims of this patent application must be generously considered, in their broadest form, in the light of the means for providing the embodiments with the described improvements, features and functions, rather than the changes and deviations which may be necessary during the comprehensive developing process. Geometry modifications and modified method steps during a regular product development, comprising aerodynamic and structural optimization, carried out by those skilled in the art, do not limit the scope of the invention. Some junctions, entities and combinations thereof, depicted in the figures are present in other embodiments too, not depicted and not described in detail. Such combinations and variations are within the scope of the invention. The wing geometry is not cast in stone.

One primary intention when designing an embodiment of the invention is to establish a primary bracing structural interconnection, a framework, between the 1st wing and the 2nd wing, comprising at least one closed frame and, by that, establishing at least one corresponding aerodynamic channel. Another primary intention is to establish another primary bracing structural interconnection, forming a closed frame between the 2nd wing and the 3rd wing and, by that, establishing a corresponding aerodynamic channel. The three wings would be cantilever wings without said bracing interconnections. An aerodynamic channel between the 1st and the 2nd wing is a frame vertically below said aerodynamic channel between the 2nd and the 3rd wing. It is obvious that said aerodynamic channels are separated and do not form a common channel. Two joined wingtips can form a primary interconnection, a direct connection, but in most embodiments, the closed frame of a primary bracing interconnection between two wings comprises at least one bracing framework member, called entity or bracing entity, in order to clarify that said framework member has a distinct and independent existence and/or a bracing function. Only one bracing entity between two wings is a case which still may be considered a direct interconnection between said wings. An entity does not form part of another entity. Two or more structurally attached entities do not form a common entity. In this context, a wingtip-fence entity ends where its end is attached to another aircraft part. Said interconnection between two main wings can comprise a chain of entities, structurally connected one after another. Each entity of said chain has two junctions with two neighboring parts, entities or wings, members of the very same closed frame. Said two junctions with said two neighboring framework members define the length of said entity. One end of said entity is located at its junction with one of said neighboring member of the frame, and the other end of said entity is located at its junction with the other of said neighboring member of the frame. The relevance of this can be illustrated with an example: The front wing FW and the tail fin TF of the conventional box wing aircraft are not stand-alone detached parts, because there is a chain of framework members interconnecting said FW and said TF, comprising a wingtip fence WF and a rear wing RW. Despite of the fact that all mentioned parts (FW, WF, RW and TF) are members of the very same frame, we do not say that FW and TF are interconnected, because it is not relevant and because it was not the primary intention of the designer to connect FW to TF. The primary intention was to establish a (primary) bracing structural interconnection between the main wings FW and RW, using the WF entity.

This reasoning is important e.g. when considering a turbofan engine, wherein some portion of said engine is a participating member of a closed frame and other portions of said engine do not form part of said closed frame. In some embodiments, the engine housing of a turbofan tip engine is attached to three aircraft parts, A, B and C, wherein one portion of the engine housing, between A and B, forms a part of one closed frame; and another portion of the engine housing, between B and C, belongs to another closed frame. In such cases, the engine housing comprises at least two bracing entities: one is between A and B, intended to be part of one closed frame; and another bracing entity is between B and C, intended to be part of another closed frame. Two-neighboring closed frames, which are two neighboring but separate aerodynamic channels, do not form a common or a third or a new closed frame because said two frames are also two separate aerodynamic channels that cannot form a common channel for the airflow. The closed frame between said A and B is one aerodynamic channel, and the closed frame between said B and C is another aerodynamic channel. Consequently, the two neighboring portions of the engine housing, the said entity between A and B and the said entity between B and C, do not form a common entity; they belong to two different frames, two different aerodynamic channels. It is not correct that there is an aerodynamic channel between A and C, comprising the portion of the engine housing all the way between A and C. Forming a closed frame and an aerodynamic channel between A and C was not the designer's intention.

In the reasoning above, the suggested design order is that the primary intention is to design a framework between two main wings and the resulting frame defines an aerodynamic channel. The opposite order (primary intention: designing an aerodynamic channel between two wings that also results in a corresponding framework) does not depart from the scope of the invention: claiming the initial or primary intention to form an aerodynamic channel which defines a closed frame is equivalent.

In some of the drawings, symmetric aircraft parts, one positioned on one side of the fuselage and another on the opposite side, are provided with only one particular reference numeral when it is clear that the numbered item has an identical mirrored counterpart.

FIG. 1 shows the basic wing configuration of the invention, a multiple closed wing aircraft, a new sub-class within Closed Wing Aircraft. There are three pairs of main wings, structurally connected to the aircraft fuselage 1. The low-mounted backward swept 1st wing 2 is extending from the low front portion of the fuselage 1. The 2nd wing 3 is structurally connected to the upper middle portion of the fuselage 1, in some embodiments as a high wing, in some embodiments as a shoulder wing, in some embodiments as a parasol wing with adequate structural connection to the top of the fuselage, as it is understood by those skilled in the art. The root of the forward swept 3rd wing 4 is elevated above the aft portion of the fuselage 1. In some embodiments like in FIG. 1, the structural interconnection between the 3rd wing 4 and the fuselage 1 comprises a solo tail fin, a vertical stabilizer 5. In some embodiments, there are more than one tail fin, in some embodiments a V-tail configuration, as it is understood by those skilled in the art. The wingspans of the three wings are basically equal in FIG. 1, but there are embodiments wherein the wingspans are not equal.

Many backward swept cantilever aircraft wings have aerodynamically efficient upward-swept wingtips, taking advantage of the accelerating spanwise flow on the upper surface of the wing, a flow towards the bent wingtip. The correct aero term for such a wingtip-extension is winglet (prior art). An upward-swept/upward-bent winglet with a smooth, curved transition area between the main portion of the wing and said upward-bent winglet, wherein the chord variation is small in the transition area, is called blended winglet (also prior art). Such a blended winglet has a smooth, relatively large radius in the transition area, like the radius shown in FIG. 1, between the main portion of the 2nd wing 3 (main wing) and its blended winglet 7. For those skilled in the art, a winglet is not a "blended winglet" if the radius in the transition area is small, like the radius shown in the junction between the 3rd wing 4 and the upper tip of the blended winglet 7. The root of the forward swept 3rd wing 4 is bent, taking advantage of the accelerating spanwise flow on the upper surface of the wing, a flow towards the bent wing root—an opposite situation. In some embodiments like in FIG. 1, there is an aerodynamic body 6 in the upper root junction, designed with the means for not disturbing said inwards spanwise flow on and above the root portion of the 3rd wing 4. There are other embodiments using other wing-wing junctions and wing-fin junctions of the prior art, as it is understood by those skilled in the art.

In FIG. 1, there is a bracing structural interconnection between the 2nd wing 3 and the 3rd wing 4, comprising a bracing entity 7, which is, in this embodiment, a wingtip fence. Said structural interconnection forms the characteristic closed frame of a box wing configuration 8, comprising said 2nd wing 3 (from root to tip), said wingtip fence 7 and said 3rd wing 4. The design of this box wing configuration 8 differs from the conventional box wing of the prior art in that sense that the first wing of a conventional box wing frame is attached to the lower portion of the fuselage. The reason for placing said box wing frame 8 in this elevated position comprises providing sufficient vertical separation between the 1st wing 2 and said box wing frame 8.

In FIG. 1, there is a bracing structural interconnection between the 1st wing 2 and the 2nd wing 3, comprising two bracing entities: 9 and 10. In this embodiment, bracing entity 9 is a forward swept anhedral lifting wing; and bracing entity 10 is a non-lifting wingtip fence. Those skilled in the art would call said part 10 the blended winglet of the 1st wing 2, in the same manner as part 7 is a blended winglet of the 2nd wing 3. Said structural interconnection forms a closed frame 11, comprising said 1st wing 2, said wingtip-fence entity 10, said bracing entity 9 and the inboard portion of the 2nd wing 3. The 1st wing 2 would be a slim, full-grown canard, seriously suffering from deformations and flutter, without said bracing structural interconnection. Those skilled in the art (with reference to Airbus EP 3 121 115 A1) would call the 1st wing 2 (the main wing), together with its blended "winglet" 10 and the bracing wing ("top wing") 9 a "wing assembly", a "C-wing" including a "C-wing like winglet" (in quotation marks: Airbus terminology), despite the upward-bent inboard portion of the bracing top wing 9. A typical "C-wing" (prior art) has no such upward-bent extra inboard portion of the top wing. The obvious reason why the depicted inboard portion of the top wing 9 is upward-bent is, that this C-wing (2, 10 and 9) is attached to another wing, and those skilled in the art would attach the two wing parts perpendicularly in the junction (good old-fashion junction, better aerodynamics and better stress distribution, known by those skilled in the art).

Figure 2:
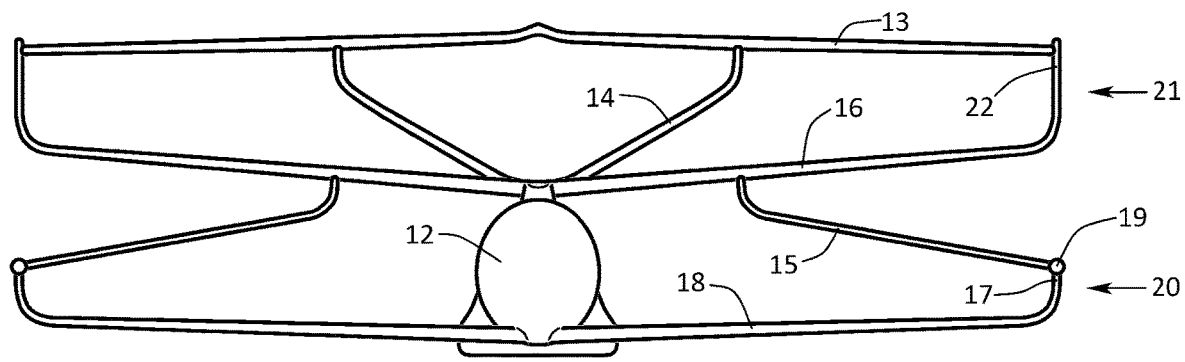
FIG. 2 is a front elevation view of a double closed wing embodiment of the invention, with a V-tail configuration.

FIG. 2 shows another embodiment of the invention, wherein the structural connection between the fuselage 12 and the 3rd wing 13 comprises two tail fins 14 in a V-tail configuration. In this embodiment, the bracing entity 15 is longer than the corresponding bracing entity 9 in FIG. 1, because said bracing wing entity 15 is attached to the 2nd wing 16 in a position closer to the root of the 2nd wing 16. There are other embodiments with different proportions. In the embodiment of FIG. 2, a very short wingtip-fence entity 17 is attached to the bent wingtip of the 1st wing 18; and an aerodynamic body 19 is connecting said wingtip-fence entity 17 to the bracing entity 15. The 1st wing 18, the very short wingtip-fence entity 17, the aerodynamic body 19, the bracing entity 15 and the inboard portion of the 2nd wing 16 form a closed frame 20. In the embodiment of FIG. 2, there is another closed frame 21, formed by the 2nd wing 16, a wingtip-fence entity 22, the 3rd wing 13 and the V-tail fin 14. The total number of closed frames is five because there is an inboard closed frame between the two V-tail fins 14 and there are two outboard closed frames on either side, 20 and 21.

It is intentional that said wingtip-fence entity 17 is very short in the depicted embodiment in FIG. 2, in order to illustrate a closed frame 20 which can be called a box wing, but it is rather a joined wing configuration. It is intentional that there is no visible edge, border or indication showing exactly where the bent wingtip of the 1st wing 18 ends and the short wingtip-fence entity 17 begins. There are embodiments wherein the wingtip-fence entity, corresponding to 17, is so short, and its internal structure is so integrated with the bent wingtip of the 1st wing that those skilled in the art would not called such a very short wingtip-fence entity a separate entity but rather call the structure in question an extended portion of the bent wingtip of the 1st wing. In such embodiments, the bracing entity 15 is attached directly to the wingtip of the 1st wing 18, a joined wing configuration. In many patents and in many research publications, boxed wing configurations and joined wing configurations are mixed up or used synonymously. All kinds of wing-wing junctions of the prior art are implemented in the various embodiments, without any limiting aspects for the scope of the invention. The most important matter is the bracing interconnection between two neighboring main wings, in order to avoid deformations, vibrations and flutter, as well as to redistribute the dynamic load and stress of an overloaded part, providing strength, stiffness and damping. Selecting adequate junctions for a preferred embodiment is a detail, not decided in this early design stage; and design solutions of such details, understood by those skilled in the art, do not depart from the scope of the invention.

Figure 3:
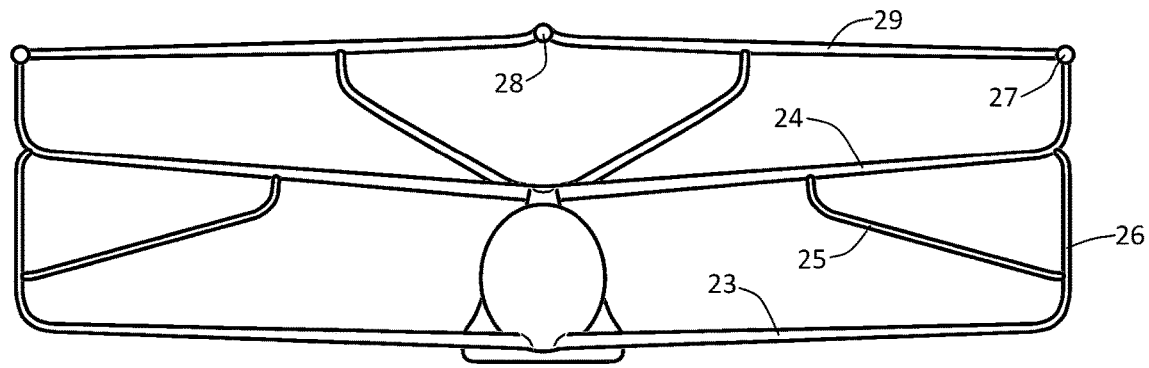
FIG. 3 is a front elevation view of an embodiment of the invention with two bracing interconnections between the 1st wing and the 2nd wing.

In some embodiments like the wing configuration in FIG. 3, there are more than one bracing between the 1st wing 23 and the 2nd wing 24. The bracing entity 25 is similar to the above bracing wings, 9 in FIGS. 1 and 15 in FIG. 2. The bracing entity 26 is a non-lifting, basically vertical side wing, in other words a wingtip-fence entity, a second bracing interconnection between the 1st wing 23 and the wingtip portion of the 2nd wing 24. Said wingtip fence or side wing 26 is long, but basically, it is a continuation of the blended winglet of the 1st wing 23. Those skilled in the art would call the bent, curved transition area between part 23 and part 26 a blended winglet (prior art), and the long vertical portion of part 26 would be called wingtip fence (prior art) or side wing (prior art). Those skilled in the art (with reference to Airbus EP 3 121 115 A1) would also call the 1st wing 23 (the main wing), together with the bracing part 26 a "C-wing", a "wing assembly", wherein part 26 is a "C-wing like winglet", wherein the lower, curved transition portion of said "C-wing like winglet" 26 is a blended "winglet", its vertical portion is a "side wing" or wingtip fence, and its upper, inward-bent portion is a (short) "top wing" (in quotation marks: Airbus terminology). The reason why the depicted "top wing" portion of 26 is inward-bent is, that this C-wing assembly (23 and 26) is attached to a curved tip portion of another wing, and those skilled in the art would attach the two wing parts perpendicularly in the junction (good old-fashion junction). The bracing wing 25 is attached to the bracing entity 26, but there are embodiments where the wingtip of the 1st wing 23 and said two bracing entities, 25 and 26, are all joined together in a common junction, with or without an aerodynamic body similar to 27 or 28, or 19 in FIG. 2. In some embodiments, the bracing entity 25 is attached directly to the 1st wing 23, with or without an aerodynamic body in their junction, and the other bracing entity 26 is attached to the outboard portion of the bracing entity 25, with or without an aerodynamic body in their junction. There are also embodiments with only one bracing interconnection between the 1st wing and the 2nd wing, similar to the side-wing entity 26 in FIG. 3. The matter of importance is that there is no embodiment with a structural interconnecting entity (no wingtip fence), directly connecting the wingtip of the 1st wing 23 and the wingtip of the 3rd wing 29, which would be the characteristic feature of the prior art.

Figure 4:
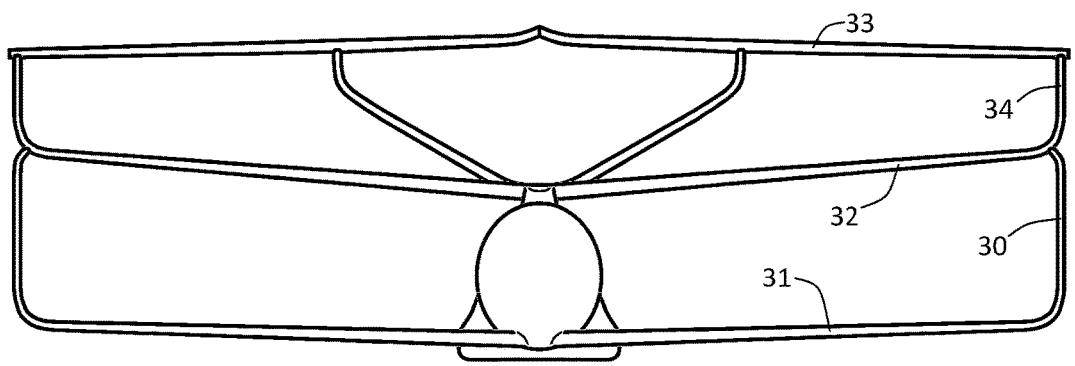
FIG. 4 is a front elevation view of an embodiment of the invention with a wingtip-fence entity between the wingtip of the 1st wing and the wingtip portion of the 2nd wing.

FIG. 4 shows an embodiment, wherein a bracing entity 30 is attached to the 1st wing 31 and the tip portion of the 2nd wing 32; but definitely not to the 3rd wing 33. Another bracing entity 34 is structurally interconnecting the 2nd wing 32 and the tip portion of the 3rd wing 33, but it is emphasized that said two entities, 30 and 34, called wingtip-fence entities or side-wing entities, are from each other different and separate entities; they do not form a common entity; their internal structures are not a continuation of each other's. The side-wing entity 30 is a member of the framework between the 1st wing 31 and the 2nd wing 32. The side-wing entity 34 is a member of the framework between the 2nd wing 32 and the 3rd wing 33. They (30 and 34) belong to two different aerodynamic channels. Using Airbus-terminology in quotation marks (ref: EP 3 121 115 A1): The 1st "wing assembly" is a "C-wing configuration" comprising the main wing 31 and a "C-wing like winglet" 30, the latter comprising a lower, curved blended "winglet", a vertical "side wing" and a (short) "top wing" which is the inward-bent upper portion of 30. The reason why the depicted "top wing" portion of 30 is inward-bent is, that this C-wing assembly (31 and 30) is attached to a curved tip portion of another wing, and those skilled in the art would attach the two wing parts perpendicularly in the junction (good old-fashion junction, prior art, as it is perfectly understood by those skilled in the art).

Figure 5:
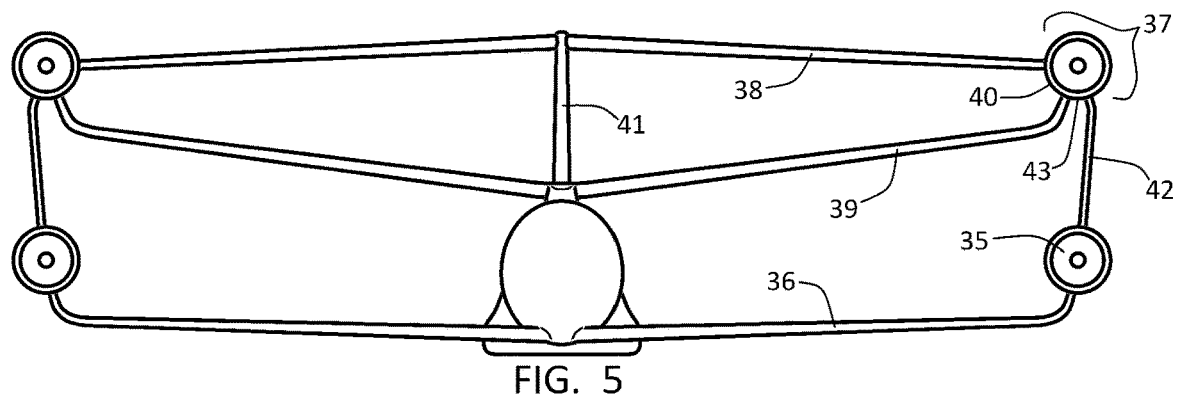
FIG. 5 is a front elevation view of an embodiment of the invention with a front engine attached to the wingtip of the 1st wing, an aft engine attached both to the wingtip of the 2nd wing and the wingtip of the 3rd wing, and a side-wing entity between the two engines.

FIG. 5 shows a structurally challenging embodiment with four propulsion units and very few framework members. The front engine 35 is attached to the wingtip of the backward swept 1st wing 36. The aft engine 37 is attached to the wingtip of the forward swept 3rd wing 38 and to the wingtip of the 2nd wing 39. The intended bracing interconnection between the 2nd wing 39 and the 3rd wing 38 is primary, comprising an inboard portion 40 of the engine housing of the aft engine 37, the portion between the 2nd wing 39 and the 3rd wing 38. Said three parts (39, 40, 38) together with the tail fin 41 form an upper, aft closed frame. Another design intention is a primary bracing interconnection between the 1st wing 36 and the 2nd wing 39, comprising a side-wing entity 42, the front engine 35 and a lower portion 43 of the engine housing of the aft engine 37, the portion between the side-wing entity 42 and the 2nd wing 39. Said five parts (36, 35, 42, 43, 39) form a lower, front closed frame. Said inboard portion 40 and said lower portion 43 of the engine housing of the aft engine 37 are two different bracing entities. They (40 and 43) belong to two different frames, two different aerodynamic channels. The 1st wing 36 and the 2nd wing 39 are interconnected as intended, and a lower closed frame is established between them, as well as a lower aerodynamic channel. The 2nd wing 39 and the 3rd wing 38 are interconnected as intended, and an upper closed frame is established between them, as well as an upper aerodynamic channel. The side-wing entity 42 is closer to the 2nd wing 39 than to the 3rd wing 38; the connection between them (42, 39) is much more direct and primary; they both are members of the very same frame, as well as the very same aerodynamic channel. Therefore, it would be incorrect to say that there is a direct structural connection between the wingtip of the 1st wing 36 and the wingtip of the 3rd wing 38, which would be the characterizing feature of the conventional box wing configuration—which is not the case here. There are two different, separated aerodynamic channels between the 1st wing 36 and the 3rd wing 38, formed by two different frames, comprising different bracing entities.

Figure 6:
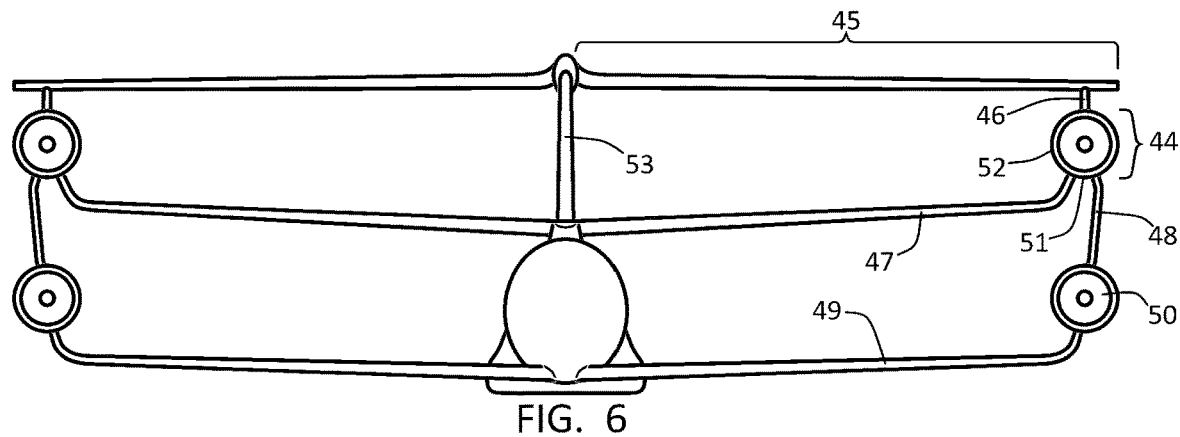
FIG. 6 is a front elevation view of an embodiment of the invention with a front engine attached to the wingtip of the 1st wing, a pylon-mounted aft engine attached to the wingtip portion of the 3rd wing and also attached to the wingtip of the 2nd wing, wherein the embodiment furthermore comprising a bracing side-wing entity between the two engines.

FIG. 6 shows an embodiment wherein the aft engine 44 and the tip portion of the 3rd wing 45 are interconnected by a bracing entity 46, providing more vertical and horizontal separation between the 2nd wing 47 and the 3rd wing 45, compared to the embodiment in FIG. 5. In some embodiments, said interconnecting entity 46 is a short side-wing entity, in other embodiments it is a pylon-structure. It is to be mentioned that a structure of such a pylon and a structure of such a side-wing in this position are basically the same bracing structures; the two names are used as synonyms in this context. This solution makes it possible to design the 3rd wing 45 with an extended tip section, outside the junction between said 3rd wing 45 and the bracing entity 46; resulting in a longer fix wing compared to the corresponding 3rd wing 38 in FIG. 5; in some embodiments even longer than in FIG. 6. There are also embodiments wherein the 3rd wing 45 has no wingtip extension outside the junction between said 3rd wing 45 and the bracing entity 46. In preferred embodiments, the upper surface of said 3rd wing 45, with or without a tip extension outside the wing-pylon junction, is free from attached parts and thereby aerodynamically undisturbed i.e. "clean" from tip to root, providing a possibility for design solutions for boosting the inwards spanwise airflow on and above the upper surface of said 3rd wing 45; an aerodynamic feature which is not a fully explored field for forward swept wings. Because of the mentioned increased vertical separation between the 2nd wing 47 and the 3rd wing 45, the 2nd wing 47 is less dihedral than the corresponding 2nd wing 39 in FIG. 5, which is another aerodynamic improvement. The bracing side-wing entity 48, attached to the 1st wing 49 via the front engine 50, is similar to the corresponding bracing entity 42 in FIG. 5, but shorter, which means less weight; a structural improvement. The intended primary structural bracing interconnection between the 1st wing 49 and the 2nd wing 47 resulted in a lower closed frame and in a lower aerodynamic channel, comprising 49, 50, 48, 51 and 47, wherein 51 is a bracing entity, the lower portion of the engine housing of the aft engine 44. The intended primary structural bracing interconnection between the 2nd wing 47 and 3rd wing 45 resulted in an upper closed frame and in an upper aerodynamic channel, comprising 47, 52, 46, most of 45 and a solo tail fin 53, wherein 52 is a bracing entity, the inboard portion of the engine housing of the aft engine 44. The side-wing entity 48 is closer to the 2nd wing 47 than to the 3rd wing 45; the connection between them (48, 47) is much more direct and primary; they are both members of the very same frame, as well as the very same aerodynamic channel. Therefore, it would be incorrect to say that there is a direct structural connection between the wingtip of the 1st wing 49 and the wingtip of the 3rd wing 45, which would be the characterizing feature of the conventional box wing configuration—which is not the case with this invention.

Figure 7:
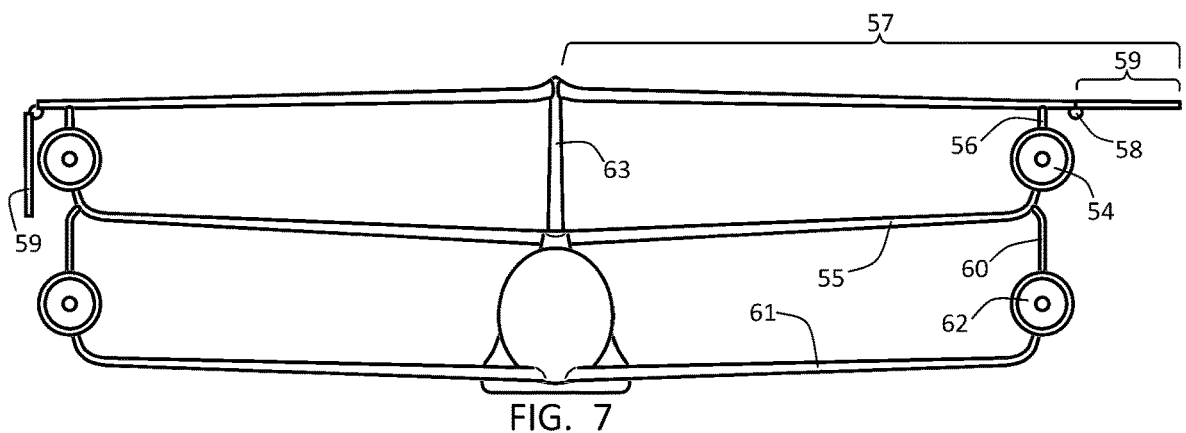
FIG. 7 is a front elevation view of an embodiment of the invention with a front engine attached to the wingtip of the 1st wing, a pylon-mounted aft engine attached to the outboard portion of the 3rd wing and also attached to the wingtip of the 2nd wing, wherein the embodiment furthermore comprising a bracing side-wing entity between the front engine and the tip portion of the 2nd wing, as well as a folding tip section of the 3rd wing.

FIG. 7 shows a modified embodiment, wherein the aft engine 54 has only two structural supporting framework members, namely the wingtip of the 2nd wing 55 and the bracing pylon entity 56, the latter also attached to the 3rd wing 57. In some embodiments like in FIG. 7, the spanwise of the 3rd wing 57 is extended much more than that of the corresponding 3rd wing 45 in FIG. 6. In FIG. 7, there is a hinge-mechanism 58 integrated with the structure of the 3rd wing 57, located outside the junction between the 3rd wing 57 and the pylon entity 56. The outboard section 59 of the 3rd wing 57, outside of said hinge-mechanism 58, is foldable, shown in folded position on the left side of FIG. 7 and shown unfolded on the right side. There is a bracing side-wing entity 60 in FIG. 7, with its upper end structurally connected to the wingtip portion of the 2nd wing 55. Said side-wing entity 60 is otherwise similar to the corresponding bracing entity 48 in FIG. 6 because its front lower end is attached to the 1st wing 61, via the front engine 62. The lower closed frame and the corresponding lower aerodynamic channel are formed by the two wings, 61 and 55, and the two bracing entities 62 and 60. The upper closed frame and the corresponding upper aerodynamic channel are formed by the two wings, 55 and 57, the two bracing entities 54 and 56 and a solo tail fin 63. This wing configuration in FIG. 7 is aerodynamically better in the area around and under the aft engine 54, compared to the configuration in FIG. 6 wherein three supporting framework members are attached to the aft engine 44.

In some embodiments, the above hinge-mechanism 58 is implemented in the wing-pylon junction. Other embodiments use other folding-wing mechanisms and folding solutions of the prior art. The depicted folded wing section 59 on the left side of the image is folded downwards, but there are embodiments wherein the folding wing section is foldable in upwards direction, in some embodiments more than 90 degrees, to save space. Pylon-mounted engine under the 3rd wing is not a prerequisite for folding the 3rd wing. Any of the configurations in FIGS. 1 to 4 can adopt this feature as described above. There are embodiments similar to those in FIGS. 1 to 4, wherein the wingtip junction of the 3rd wing has a hinge-mechanism with an attached outboard wing section, capable to fold as this feature is described above. The means for providing the 3rd wing with an extended tip section comprises the means for achieving higher Aspect Ratio as well as the means for increasing the inwards spanwise airflow on and above the forward swept 3rd wing. The means for providing the above extended tip section with folding capability comprises the means for reducing the wingspan on the ground, which is important because of airport restrictions. In preferred embodiments, the folding wing section has the same sweep as the rest of the 3rd wing. In other embodiments, the folding wing section has a different sweep angle. Backward swept folding tip section of a forward swept 3rd wing does not depart from the scope of the invention. Patent prophylaxis: the rear wing of the conventional box wing or joined wing aircraft as well as a cantilever wing with mid-portion bracing can also be designed by adding the folding-wing feature as described above; only obvious modifications are needed, as it is understood by those skilled in the art.

Figure 8:
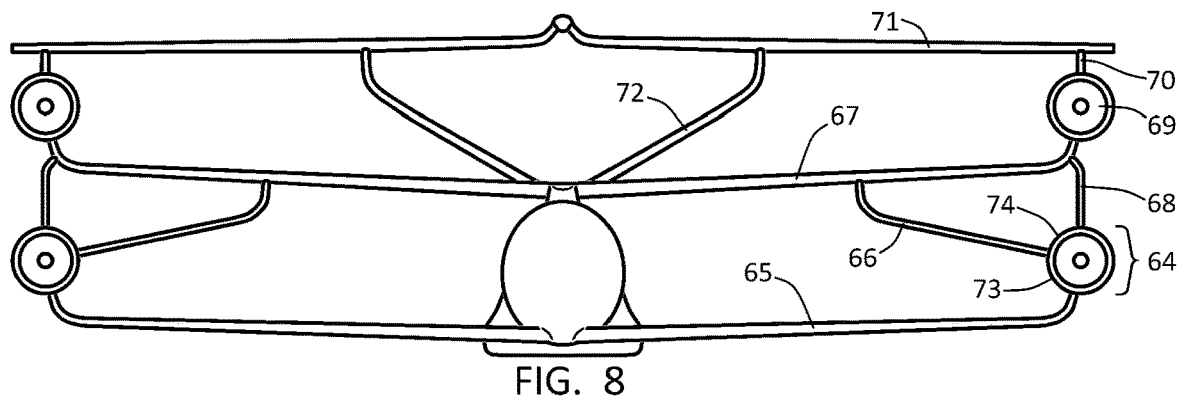
FIG. 8 is a front elevation view of a V-tail embodiment of the invention with a front engine attached to the wingtip of the 1st wing, a pylon-mounted aft engine attached to the wingtip portion of the 3rd wing and also attached to the wingtip of the 2nd wing, wherein the embodiment furthermore comprising a bracing side-wing entity between the front engine and the tip portion of the 2nd wing, as well as an additional forward swept anhedral bracing wing entity between the mid-portion of the 2nd wing and the front engine.
Figure 9:
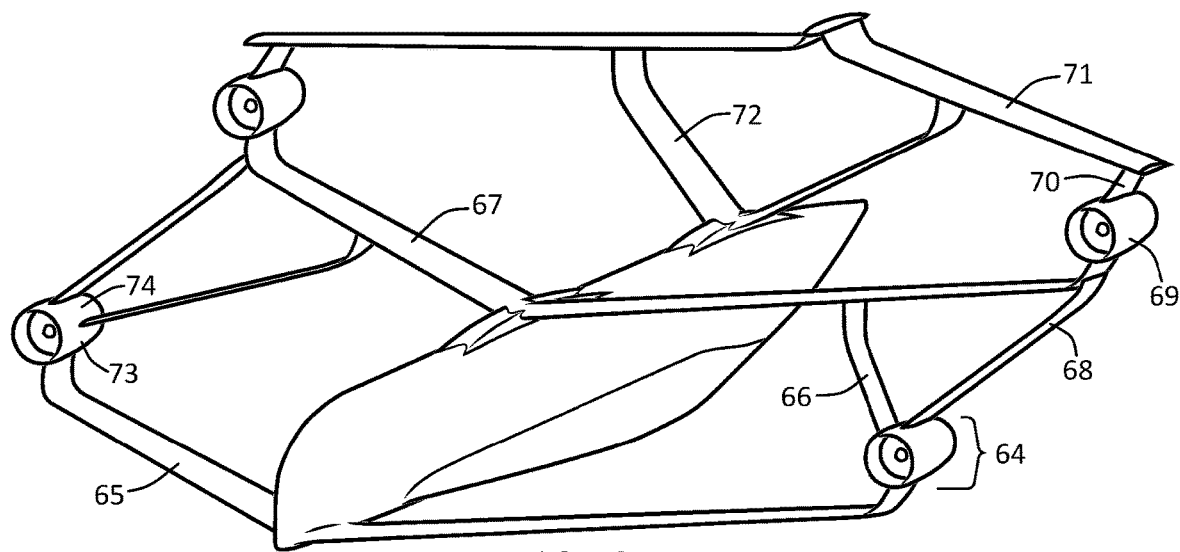
FIG. 9 is a perspective view illustration of the aircraft of FIG. 8.
Figure 10:
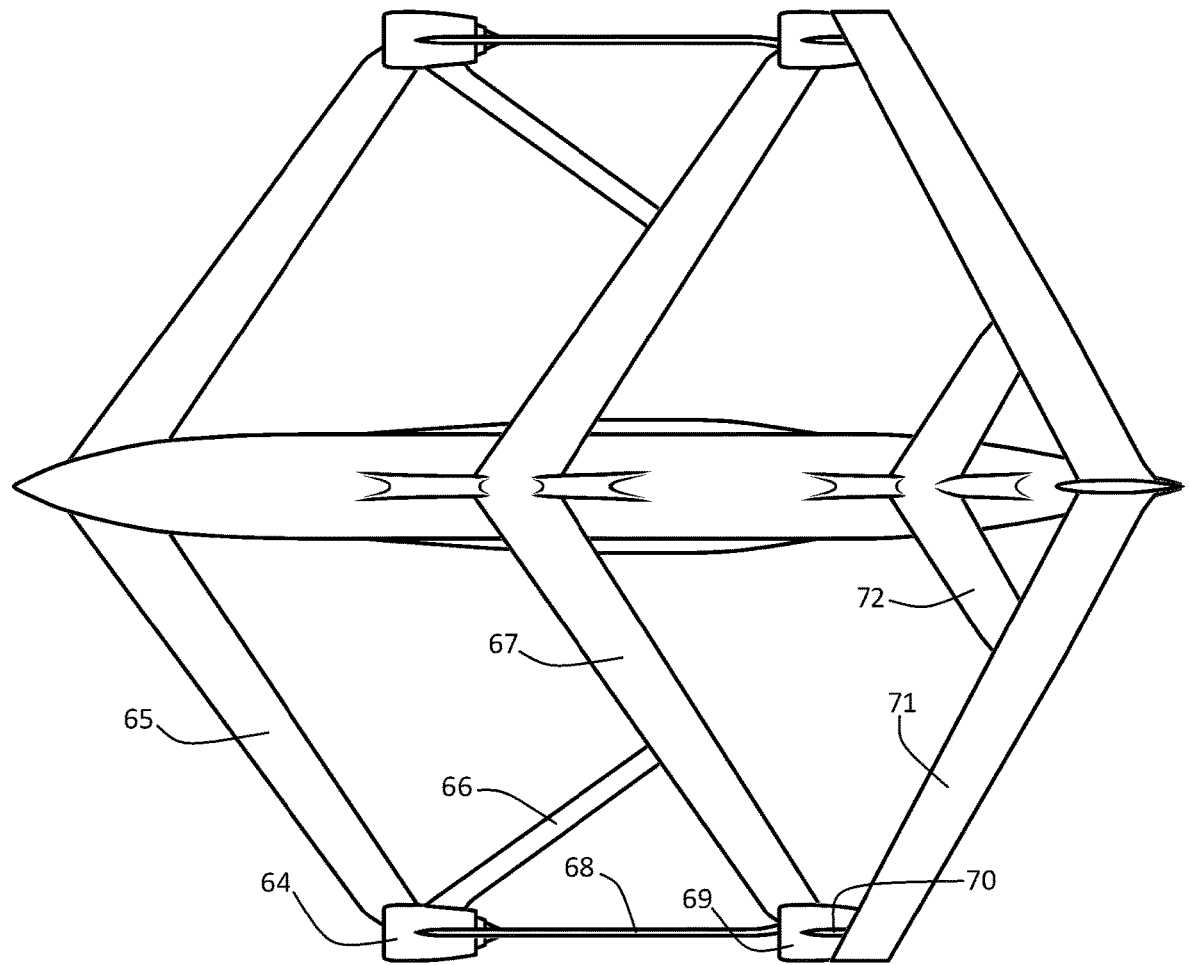
FIG. 10 is a top plane view of the aircraft of FIG. 8.
Figure 11:
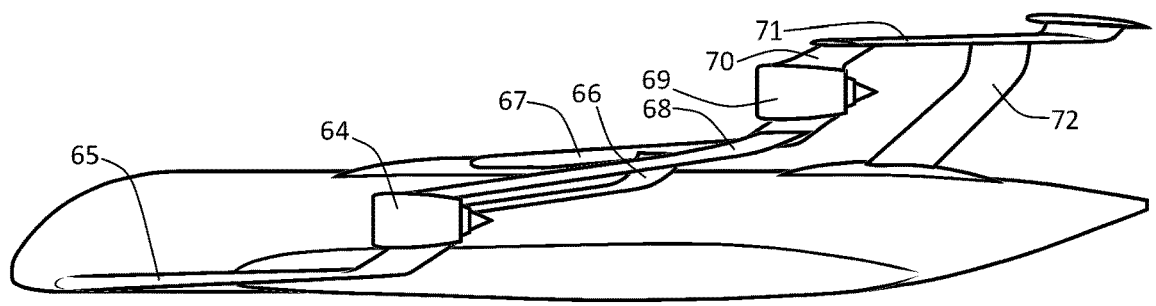
FIG. 11 is a side elevation view of the aircraft of FIG. 8; the right and left side views are mirror images.

FIG. 8 shows a more robust framework, wherein the front engine 64 has three supporting framework members: the wingtip of the 1st wing 65; a bracing entity 66 which is, in this embodiment, a forward swept anhedral lifting wing with its root attached to the mid-portion of the 2nd wing 67; and a bracing entity 68 which is, in this embodiment, a non-lifting side wing with its upper end attached to the tip portion of the 2nd wing 67. The aft engine 69 is supported by the wingtip of the 2nd wing 67 and a bracing entity 70 which is, in this embodiment, a pylon or a short side wing, attached to the 3rd wing 71. There are embodiments like the one in this FIG. 8 but without the bracing wing entity 66. There are embodiments like the one in this FIG. 8 but with one tail fin instead of the V-tail configuration 72. It is easy to predict that the aerodynamic performance will be better with one vertical tail fin instead of two highly dihedral fins, but it is difficult to predict the aeroelastic behavior and the flutter tendency of such a complex framework when two framework members, namely two tail fins, are replaced with one. The V-tail configuration 72 in FIG. 8 is meant to strengthen the 3rd wing 71 in the middle portion when the aft engine 69 has only two supporting framework members, namely the pylon-entity 70 and the 2nd wing 67. On the other hand, the tip portion of said 2nd wing 67 is supported by the side-wing entity 68. There are embodiments wherein the wingtip of the 3rd wing 71 ends at the junction with the bracing entity 70. The primary bracing structural interconnection between the 1st wing 65 and the 2nd wing 67 is a framework comprising two closed frames and two aerodynamic channels: one closed frame and the corresponding aerodynamic channel comprising the 1st wing 65, the two bracing entities 73, 66 and the inboard portion of the 2nd wing 67, wherein 73 is the lower inboard portion of the front engine 64; the other closed frame and the corresponding aerodynamic channel comprising the three bracing entities 66, 74, 68 and the outer portion of the 2nd wing 67 between 66 and 68, wherein 74 is the upper inboard portion of the front engine 64. The primary bracing structural interconnection between the 2nd wing 67 and the 3rd wing 71 is a framework comprising a closed frame and a corresponding aerodynamic channel, comprising 67, 69, 70, the outboard portion of 71, between 72 and 70, and the V-tail fin 72. The total number of closed frames in FIG. 8 is seven, because the inboard portion of the 3rd wing 71 together with its mirrored counterpart and both V-tail fins 72 form a rear closed frame. The total number of corresponding aerodynamic channels are also seven.

There are embodiments like the robust configuration presented in FIG. 8 with all the above described versions of the folding wing technique implemented for the 3rd wing. Folding the tip section of the 3rd wing is especially advantageous when the 3rd wing is supported in three points, namely at the root, in its mid-portion by a V-tail fin, and with a bracing interconnection in the outer portion of the wing. One drawback is that such an unsupported tip of a long and slim extended forward swept tip section can suffer from deformations, vibrations and flutter, especially when the structure is foldable. There are embodiments wherein the front engine has three supporting parts like in FIG. 8, and the aft engine has also three supporting parts like in FIG. 6.

There are embodiments like in FIG. 8 but without the bracing entity 66, and there are others without the bracing entity 68. There are embodiments like in FIG. 6 or in FIG. 5, with an additional bracing entity like 66 in FIG. 8. Adding and removing bracing entities and/or tail fins as well as combining the presented junctions are design options within the scope of the invention, but it is impossible to select the preferred embodiment for a given mission profile, without comprehensive aerodynamic and structural evaluations of all relevant embodiments.

Figure 12:
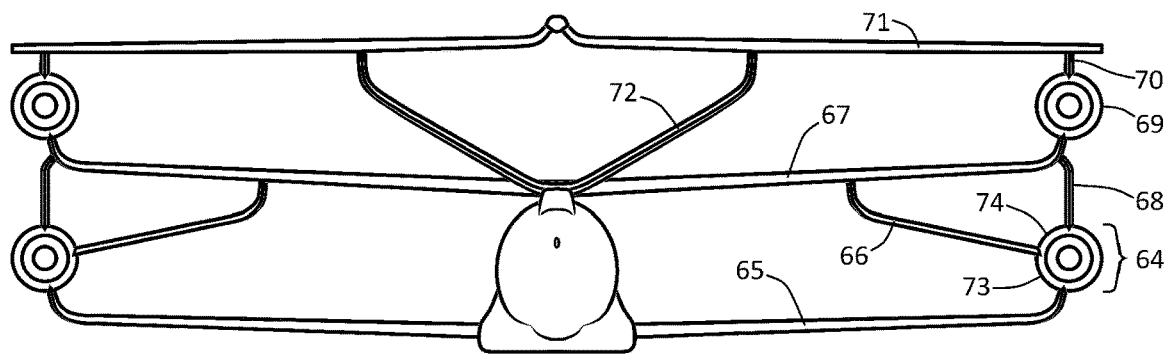
FIG. 12 is a rear elevation view of the aircraft of FIG. 8.
Figure 13:
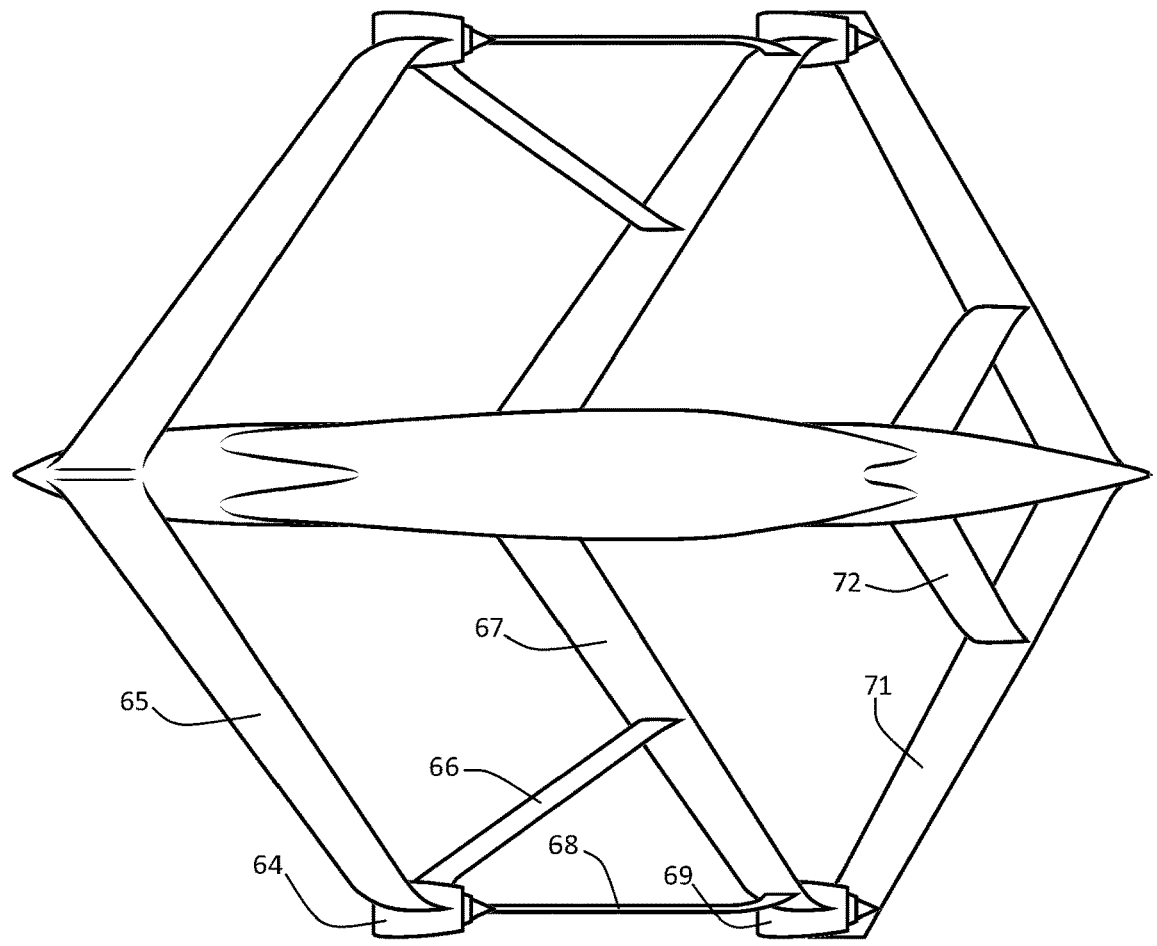
FIG. 13 is a bottom plane view of the aircraft of FIG. 8.

FIG. 9 to FIG. 13 are different views of the aircraft of FIG. 8, one of the preferred embodiments of the present invention. The front and rear views, FIG. 8 and FIG. 12, are shown in enlarged scale, compared to dimensions of the top, side and bottom views, FIGS. 10, 11 and 13, respectively. The reference numerals in FIG. 8 to FIG. 13 are identical.

The presented embodiments are results of several method steps, applied in order to improve the closed wing aircraft concept, which is an aerodynamic and structural improvement compared to the cantilever concept. The multiple closed frame structure, comprising three pairs of main wings, offers structural strength and stiffness, regardless if it is a box wing or a joined wing configuration. The unsupported tip of a standard cantilever wing is deformed in terms of position, airfoil twist and shape. It also oscillates because the forces are never constant during a flight. The structural bracing interconnection between two wings does minimize these deviations from the pre-calculated geometry and from the corresponding aerodynamic values, optimized for the mission. Selecting three pairs of wings in the beginning of the design process is a method step providing sufficient wing area using aerodynamically preferable thin and narrow wings and, at the same time, reducing the wingspan which is desirable for very large aircraft, because of airport restrictions. Selecting three pairs of wings is a method step reducing the load and stress per wing, making it possible to use more composite materials. Using three pairs of wings offers one third load per wing compared to the cantilever concept with similar wing area. The long fuselage, the heaviest part of most aircraft, is lifted near the front, near the aft and in the middle. The design with said three-point lift makes it possible to build lighter fuselage, also with using more composites. Designing with the intention to use more composites in the entire structure means also better thermoelastic behavior because a three-dimensional multiple-element closed framework made by composites deforms much less than a metal structure, when the temperature changes. Composites with low thermal expansion coefficient are an issue of lower magnitude for such a complex framework. The reason for designing a low-mounted 1st wing near the front, a top-mounted 2nd wing as well as positioning the root of the 3rd wing as depicted and described is to make it possible to build all three pairs of wings as carry-through beams, a stronger structure than using bolts in a wing-fuselage junction.

The method step of designing a 2nd wing as a continuous wing from root to tip, without attaching any aircraft part to the upper surface of said 2nd wing, is an improvement compared to the above mentioned WO2016048211 A1, wherein the corresponding "Middle Wing" is divided into a backward swept root section and two tip sections wherein both tip sections are connected to a wingtip fence, the entity interconnecting the wingtip of the "Front Wing" and the wingtip of the "Rear Wing". Thereby, the root section of said "Middle Wing" has an upper surface, separated from the elevated upper surface of the backward swept tip section. There is a spanwise outwards motion of the air on and above said upper surface of the said root-section, and there is another, separate outwards motion of the air on and above the upper surface of the said backward swept tip section. The other tip section of said "Middle Wing" is forward swept and thereby there is a spanwise inwards motion of the airflow on and above said forward swept tip section, from the tip towards the root of said tip section. The junction area of said forward swept tip section and the backward swept root section has aerodynamic issues, because the spanwise outwards airflow on and above the root section and the meeting spanwise inwards airflow on and above the forward swept tip section result in a leading-edge shock. The reason for the undivided, continuous 2nd wing of the present invention is to provide an uninterrupted, full-length spanwise outwards motion of the air, accelerating on and above the upper surface of said 2nd wing, all the way from the root to the tip. This spanwise flow is directly related to the measured (full-length) spanwise, which is directly related to the Aspect Ratio as it is understood by those skilled in the art; and the higher Aspect Ratio the higher the aerodynamic performance.

The Aspect Ratio is proportional to the square of the span. One Aspect Ratio value must be calculated for the root section of the "Middle Wing" of the mentioned WO2016048211 A1, and another Aspect Ratio value must be calculated for the said backward swept tip section of said WO2016048211 A1. The total value of the Aspect Ratio for two separated wing sections is always lower than the Aspect Ratio calculated for the (same-length) entire wingspan, the case for the present invention, as it is understood by those skilled in the art. Thereby, the method step of designing the 2nd wing of the present invention as an undivided, continuous wing from root to tip is an aerodynamic improvement compared to WO2016048211 A1.

The depicted and described wings of several embodiments of the present invention have bent tips and/or roots. This design method step is partly meant as a general method to achieve smooth junctions but also meant as a method to boost the above mentioned spanwise flow on and above the wings, a source of aerodynamic improvement. The Lift over Drag ratio is considerably higher on an upward-bent wingtip of a backward swept wing, a well-known feature. It is less known that this phenomenon applies to an upward-bent root of a forward swept wing too. That is the reason for the method step of designing the forward swept 3rd wing with bent root, in several embodiments. Many embodiments are designed with junctions wherein one member of the frame, often a wing with a bent root or tip, is attached perpendicularly to the surface of another aircraft part. This design method is also known, at least in some aero applications, as an aerodynamic improvement. A wing assembly, including an upward-bent blended winglet (prior art) plus an inward-bent upper portion of the vertical extension of the blended winglet, has the shape of a "C-wing" or "C-wing like configuration" with a "C-wing like winglet", with reference to Airbus patent EP 3 121 115 A1, e.g. FIG. 7 & section [0117]. Using this (correct) Airbus-terminology: the 1st wing (30 and 31) in FIG. 4 of the present invention is a "C-wing" with a "C-wing like winglet". Even the 1st wing (2, 10 and also including 9) in FIG. 1 of the present invention is a "C-wing" with a "C-wing like winglet", despite the extra upward-bent upper portion of the bracing "top wing" 9. Regarding the root junction of the two forward swept 3rd wings, in all embodiments, it is a place where two inwards spanwise airflows are colliding, resulting in a leading-edge shock, as it is understood by those skilled in the art. Unfortunately, it is hard to find a good aerodynamic solution in the prior art. Shape optimization can result in modified root airfoil geometry and an aerodynamically well-designed extra body in the junction can also reduce the problem.

The more bracing entities or members in a framework, the stronger and stiffer the structure, but also the higher the aerodynamic penalty. The intention to achieve low aerodynamic interference and the intention to reduce wetted area and weight are contradictory to the intention to achieve structural strength. One aspect of designing embodiments with several closed frames like in FIG. 8 is to have more aerodynamic channels for the airflow; seven in said FIG. 8 because the number of closed frames is seven. The minimum number of aerodynamic channels, as well as closed frames, is four, like in FIG. 6 or FIG. 7. The choice between a solo tail fin and two V-tail fins has far more implications than number of aerodynamic channels and structural aspects. The V-tail fins act like both elevators and rudders; they have extra place for aerodynamic devices which means redundancy; they have a significant pitch effect for stall recovery; and they provide extra lift, especially at takeoff and climbing. On the other hand, the two V-tail fins have a large wetted area and they disturb the incoming flow on the 3rd pair of wings. They also have an aerodynamically poor fin-fuselage junction.

The obvious and conventional place for at least one pylon-mounted turbofan engine would be the mid-portion of the 2nd wing. However, designing a novel invention inspires a non-conventional placement of the propulsion units too, like in FIG. 5 to FIG. 8. The reasons for this design solution, namely deploying the engines in full spanwise position comprises: decreasing the root bending during the flight; minimizing the cabin-noise; adding efficient maneuverability as regards yaw; and also, giving a possibility to boost the speed of the airflow on and above the surrounding wingtips, because the strong inlet suction and the high-velocity outlet gases speed up the airflow around the engine housing. There are embodiments with only one tip engine on either side, but embodiments with four tip engines is a safer design solution, because of higher redundancy. A modern engine housing and the adjacent closed frame is a structure strong enough to resist bird strike or blow-out, but the integrated structure of wings and engines can be further reinforced to avoid disintegration and wing loss if/when something is to go wrong with the engines. Combination of metal and composite materials can be carefully selected for optimal strength and stiffness, as well as for damping the vibrations from the engines. The depicted engines and the attached framework members mutually support each other, and the force vectors acting on said attached members point in different directions; an effective design solution to level out or redistribute the dynamic load and stress.

In some embodiments, the selected propulsion units have different characteristics, adapted to the optimized stress-distribution, calculated for the entire wing structure. One example of this method is embodiments like in FIG. 5 wherein the front engine is selected for producing more thrust than the rear engine, with the means for making sure that the long and narrow side-wing entity 42, between the engines, is to be exposed for tensile stress only. There are embodiments with static embedded stress in the wing frame, for example built-in tension, in order to achieve better redistribution of the dynamic load and the deformations during flight. One reason for presenting many different junctions is to indicate that it is not enough to design smooth junctions for good aerodynamics but it is necessary to find a balance considering structural strength and weight, too. The presented junctions provide a (non-exclusive) wide variety of options for selecting the most suitable version in every location, when the final design for a certain mission profile is to be developed. In general terms, the wing geometry may be different in different embodiments if there can be found structural or aerodynamic reasons for that, considering the selected mission profile. Planform, wingspans, dihedral/anhedral and sweep angles and all other wing geometry parameters are to be considered design variables, targets to be optimized in the mentioned comprehensive multidisciplinary process which is absolutely necessary in a later stage of the aircraft development.

There are embodiments with traditional pylon-mounted engines too, and pylon-mounted engines attached to the 2nd wing is still a position higher up than pylon-mounted engines attached to a low wing. One of the reasons behind the method step of placing the aft engines so high as depicted is to elevate the hazardous area for airport personnel and airport vehicles, because the two upper engines alone are more than enough for taxiing. These high-mounted engines make it possible to design lower landing gear assemblies with less weight. Another reason for placing the aft engines in this position is to give a powerful tool for the pilot or autopilot to recover from a stall with more power from the upper engines, creating a pitching moment pushing the nose down. The classic failure, when the lift force on a low-mounted wing of a cantilever aircraft collapses after a stall, is that the pilot tries to compensate the speed loss and the altitude loss with more power, and the extra power from the low-mounted engines, located below the Center of Gravity, gives an extra torque, lifting the nose even more. The opposite will happen when the extra thrust is coming from high-mounted engines. Tip engines are also useful as a complement or even substitute to the rudder, adding redundancy to maneuvering the aircraft. The reason to design embodiments with four tip engines rather than two is that only one tip engine on one side is probably not enough when the other one on the opposite side is out of order, because the torque/yaw from only one working engine at spanwise distance from the Center of Gravity is difficult to balance with aerodynamic devices. Two engines working on one side and one on the opposite side may provide sufficient maneuverability when it comes to emergency landing. A belly landing may not necessarily hurt the engines because the aircraft is gliding relatively smoothly on its belly and on the flap track fairings of one of its 1st dihedral wings. Landing on water is also smooth, because no engine hits the surface. Emergency evacuation is safer when the engines are located as far as possible from the fuselage. One drawback of the described and depicted tip engines is that there are at least two bracing entities or wings attached to each engine, making maintenance difficult, but there are existing top-mounted engines, wherein the engine housing is integrated with both the fuselage and the vertical stabilizer, so the accessibility issues are basically solved. There are also embodiments like in FIG. 5 to FIG. 8 with more propulsion units than depicted, deployed along or integrated with the structure of the side-wing entities 42, 48, 60 and 68, respectively. Location of propulsion units is not limited to the depicted and described positions.

The presented embodiments offer a number of options for bracing, junctions and other details, within the scope of the invention. The reason for this, and the reason for why the scope of the invention as well as the claims should be understood and interpreted in their broadest form, is that this very complex wing concept is in the early design stage. The methods and apparatus presented here have a long way of research and development to be implemented as man-carrying aircraft, an accepted part of our infrastructure. Less complicated inventions with far less obligations to please international regulations, safety procedures, passenger acceptance, etc. should have narrower scope and narrower claims than the present invention. One example of what engineers working with further development must deal with, is the wing-engine junctions as regards maintenance access. Another example is visibility regulations for the pilots which may force the developers to move the 1st wing further back, despite the intention to position this wing as front as possible, to achieve higher sweep for higher speed and to achieve better cross-sectional area distribution, and also because of more horizontal separation of the wings. Design for one-engine failure is necessary, and the structural consequences may demand that embodiments with only two connected bracing members per engine must be abandoned and the wing-engine junctions must be much more robust (third example). Limitations for landing distance can lead to redesigning the wings with less sweep, for better efficiency of the high-lift devices (fourth example). A fifth example is aesthetic aspects with huge impact to passenger acceptance and marketability, which is impossible to anticipate and include in this description. The deep domain expertise must come from many disciplines and full consensus must be achieved including the analysis expertise closest related to this early design stage.

A number of qualities and benefits of the present invention should be briefly mentioned, where the distinguishing features of this invention improve, or significantly improve, the closed wing aircraft as such. Aerodynamic simulations (CFD in cruising conditions) indicate a significant performance superiority compared to a reference aircraft (a very large transonic airliner), despite the lack of comprehensive optimization of the wing geometry. This aerodynamic superiority and the corresponding good fuel efficiency mean lower environmental impact, lower noise, larger payload, longer range and lower fuel consumption per seat-kilometer. The cross-sectional area distribution is also much better than that of a reference cantilever aircraft. Some of the improved features and functions are: flexibility with cargo placement; reduced concerns as regards stall; good maneuverability and stability in difficult flying conditions; redundant aerodynamic devices in many places that also provide increased safety; lower angle of attack in level flight; as well as reduced speed and less engine power with less noise at takeoff and landing. The three pairs of main wings are carry-through structures, lifting the heavy fuselage in three points. This three-point lift makes it possible to significantly reduce the weight of a very long fuselage. This invention makes it possible to build very large aircraft with a relatively short wingspan, manageable for our airports. Three slim and relatively short wings can provide both large wing area and high Aspect Ratio. The distributed/redistributed load on said relatively short closed wings provides strength and stiffness, which opens up the possibility of using more composite materials in the wings. The closed frames of the interconnected parts form a strong and rigid framework structure with sufficient separation for acceptable aerodynamic interference. All wingtips are mutually supported; stress, deformations and flutter are minimized. Bent wing portions (e.g. blended winglets, prior art; C-wing like winglets, prior art) improve the local Lift over Drag ratio, and the tip engines speed up the local airflow around the nearby wing portions. The weight of the tip engines reduces the root bending during the flight. The vibrations from the tip engines are effectively damped, when each engine is supported by two or three structural bracing parts, pointing in different directions. All these novel features and improvements mean a higher grade of industrial applicability for the presented new concept. The viability threshold for a realized application is thereby getting much closer. The multiple closed frame structure is complex, but materials and manufacturing methods and processes which are expensive today, will be cheap tomorrow. Therefore, certain embodiments, industrially applicable but expensive today are not excluded from the scope of the invention. Embodiments with electric propulsion, rocket-propulsion, distributed propulsion deployed along portions or along the entire length of at least one wing, as well as adaptive control of morphing wings do not depart from the scope of the invention. The long list of means for improving the closed wing structure also comprises the morphing wing technology, which is easy to implement (chordwise), because of the limited deformations of the closed frames as a whole, thanks to the rigid core of the wing structure with supported wingtips. The morphing wing technology is implemented in some embodiments, at least for one wing.

What is claimed is:

1. A method for improving a closed wing aircraft, the method comprising steps of:

designing an aircraft fuselage and designing three main wings on each side of the aircraft fuselage, namely a 1st wing, a 2nd wing and a 3rd wing, wherein: the 1st wing is backward swept which extends from a lower part of a front portion of the aircraft fuselage; the 2nd wing is dihedral, located horizontally behind and vertically above the 1st wing and structurally connected to an upper middle portion of the aircraft fuselage as a shoulder wing, a high wing or a parasol wing; the 3rd wing is forward swept, located horizontally behind and vertically above the 2nd wing and structurally interconnected to the aircraft fuselage in a way comprising at least one tail;

designing the 1st wing with an upward-bent tip section with a curved transition area;

designing the 2nd wing with an upward-bent tip section with a curved transition area;

designing a structural interconnection between the 1st wing and the 2nd wing comprising a bracing side-wing entity with its lower end connected to an upper end of the upward-bent tip section of the 1st wing, wherein an upper end of said bracing side-wing entity has an inward-bent tip section connected to the curved transition area of the upward-bent tip section of the 2nd wing, forming a bracing framework between the 1st wing and the 2nd wing which comprises a closed frame forming an aerodynamic channel;

designing a structural interconnection between the 2nd wing and the 3rd wing comprising a bracing wingtip-fence entity, interconnecting an upper end of the upward-bent tip section of the 2nd wing and a wingtip or a wingtip portion of the 3rd wing, forming a bracing framework between the 2nd wing and the 3rd wing which comprises a closed frame forming a corresponding aerodynamic channel, wherein said bracing wingtip-fence entity is different from the bracing side-wing entity;

f) designing the 3rd wing with an upward-bent root section with a curved transition area;

wherein, the structural interconnection between the 1st wing and the 2nd wing comprises a propulsion unit, wherein said propulsion unit is connected to the upper end of the upward-bent tip section of the 1st wing; and wherein the structural interconnection between the 2nd wing and the 3rd wing comprises another propulsion unit, wherein said another propulsion unit is connected to the upper end of the upward-bent tip section of the 2nd wing.

2. The method of claim 1 further comprising:

the designing the 3rd wing further comprises designing a folding outboard section, located outside a junction with said bracing wingtip-fence entity; wherein the 3rd wing comprises a hinge located at the junction with said bracing wingtip-fence entity, or located outside said junction.

3. A manned or unmanned aircraft comprising:

an aircraft fuselage;

a wing configuration on each side of said aircraft fuselage, comprising (i) a backward swept 1st wing, extending from a lower part of a front portion of the aircraft fuselage; (ii) a dihedral 2nd wing, located horizontally behind and vertically above the backward swept 1st wing and structurally connected to an upper middle portion of the aircraft fuselage as a shoulder wing, a high wing or a parasol wing; (iii) a forward swept 3rd wing, located horizontally behind and vertically above the dihedral 2nd wing and structurally interconnected to the aircraft fuselage in a way comprising at least one tail fin, wherein (i) the backward swept 1st wing has an upward-bent tip section with a curved transition area;

(ii) the dihedral 2nd wing has an upward-bent tip section with a curved transition area;

(iii) the forward swept 3rd wing has an upward-bent root section with a curved transition area;

a structural interconnection between the backward swept 1st wing and the dihedral 2nd wing comprising a bracing side-wing entity with its lower end connected to an upper end of the upward-bent tip section of the backward swept 1st wing, wherein an upper end of said bracing side-wing entity has an inward-bent tip section connected to the curved transition area of the upward-bent tip section of the dihedral 2nd wing, forming a bracing framework between the backward swept 1st wing and the dihedral 2nd wing, which comprises a closed frame forming an aerodynamic channel;

d) a structural interconnection between the dihedral 2nd wing and the forward swept 3rd wing comprising a bracing wingtip-fence entity, interconnecting an upper end of the upward-bent tip section of the dihedral 2nd wing and a wingtip or a wingtip portion of the forward swept 3rd wing, forming a bracing framework between the dihedral 2nd wing and the forward swept 3rd wing which comprises a closed frame forming a corresponding aerodynamic channel, wherein said bracing wingtip-fence entity is different from the bracing side-wing entity;

wherein the structural interconnection between the backward swept 1st wing and the dihedral 2nd wing comprises a propulsion unit, wherein said propulsion unit is connected to the upper end of the upward-bent tip section of the backward swept 1st wing; and wherein the structural interconnection between the dihedral 2nd wing and the forward swept 3rd wing comprises another propulsion unit, wherein said another propulsion unit is connected to the upper end of the upward-bent tip section of the dihedral 2nd wing.

4. The manned or unmanned aircraft of claim 3, wherein the forward swept 3rd wing comprises (i) a folding outboard section located outside a junction with said bracing wingtip-fence entity, and (ii) a hinge located at said junction with said bracing wingtip-fence entity, or located outside said junction.

* * * * *